H. WEGWART.
REVERSIBLE COVER FASTENING.
APPLICATION FILED SEPT. 17, 1914.
1,205,297.
Patented Nov. 21, 1916.
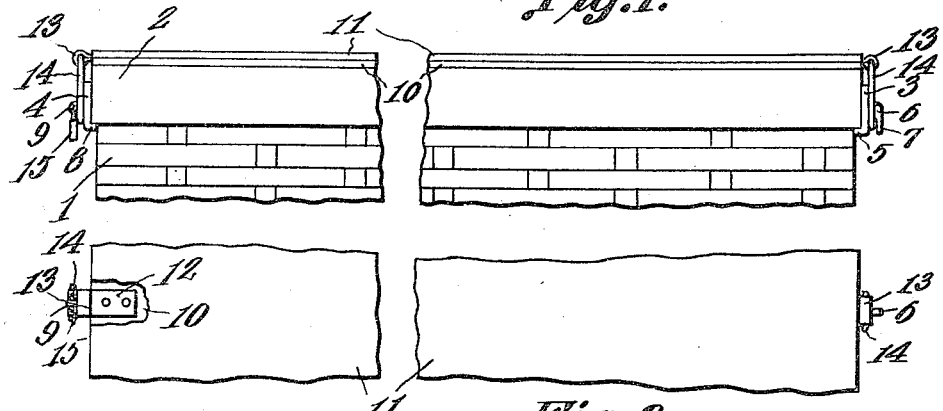
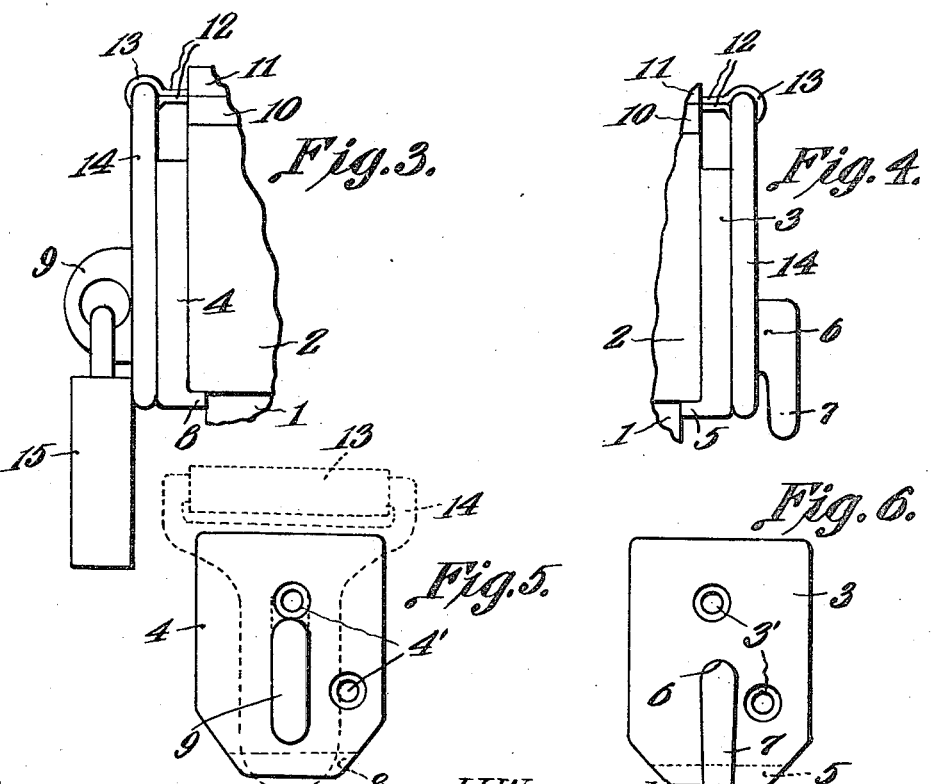
Witnesses
H. Wegwart, Inventor
by Attorneys

UNITED STATES PATENT OFFICE.

HERMAN WEGWART, OF BURLINGTON, WISCONSIN, ASSIGNOR TO BADGER BASKET & VENEER CO., OF BURLINGTON, WISCONSIN.

REVERSIBLE-COVER FASTENING.

1,205,297.　　　　　Specification of Letters Patent.　　Patented Nov. 21, 1916.

Application filed September 17, 1914. Serial No. 862,250.

*To all whom it may concern:*

Be it known that I, HERMAN WEGWART, a citizen of the United States, residing at Burlington, in the county of Racine and State of Wisconsin, have invented a new and useful Reversible-Cover Fastening, of which the following is a specification.

The present invention relates to improvements in reversible cover fastenings, relating more particularly to that type of fastening for attaching covers to baskets or hampers for shipping purposes, one object of the present invention being the provision of a simple fastening means adapted to be carried by the cover and by the rim of the basket at the respective ends thereof so as not to interfere with the handles of the basket and yet at the same time permit the cover to be locked in position and to be readily removed, reversed and again placed in position, thus providing an attachment whereby the hamper or basket may be used as a return shipment basket.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a side elevation of the upper portion of a basket or hamper, said basket or hamper being foreshortened and having the present attachment connected thereto for holding the cover upon the basket or hamper. Fig. 2 is a top plan view of a central longitudinal section of the cover of the basket or hamper with the present invention applied. Fig. 3 is a side elevation of the complete fastening at one side of the hamper or basket. Fig. 4 is a similar view of the complete fastening at the opposite side of the basket or hamper. Fig. 5 is the padlock receiving member of the fastening device. Fig. 6 is the hooked terminal device.

Referring to the drawings, the numeral 1 designates the basket which in the present instance is indicated as a splint basket having the reinforced upper rim 2 to which is attached the two fastening plates 3 and 4.

The plate 3, as clearly illustrated in Figs. 4 and 6 is provided with a lip 5 which is adapted to engage the under side of the rim 2 and thus with other fastening means entering the apertures 3' of the plate hold the plate against twisting movement. The projection 6 provided with a tongue 7, which with the plate constitutes a hook, is formed integral with the plate 3, the purpose of which will presently appear. The attaching plate 4 is provided with a lip 8, which is similar to the lip 5 and coacts with the apertures 4' in maintaining the plate 4 properly assembled upon the rim 2.

The cover of the basket is composed of two plates 10 and 11, thus making a laminated cover, so that the two terminals 12 of the hinging plate or member 13 may be properly assembled between the laminations and be secured by rivets or other means thereto, as clearly illustrated at the left in Fig. 2. Pivotally connected to the hinging portion of the member 13 is a bail 14, which is adapted when the cover is first assembled to be positioned to engage the hooked members 6—7 of the plate 3 so that the cover may be positioned as shown in Fig. 1, the bail 14 at the left being positioned to slide upon the padlock receiving lug 9 of the plate 4, so that the padlock 15 may be properly connected thereto. By this means, the padlock holds the fastening in position while the hook 7 prevents the bail 14 at the opposite end from being disconnected from the plate 3.

As the pivoted bails 14 are permitted a swinging movement, the latitude of which is greater than 180 degrees, the relative position of the same on either side of the top will regulate which surface of the top will be exposed, thus providing a reversible cover for baskets or hampers and especially adapting the same for return shipment. Thus one surface may carry the address of the laundry, in places where the hamper is used for such work, while the other contains the address of the patron. It will thus be seen that by constructing the bail carrying member 12 of a single strip of metal bent upon itself so as to form the hinging member 13, that the terminals 12 may be placed co-extensively and between the laminations of the cover or be placed upon a single thickness by means of rivets or screws so that the bail 14 may be swung to either side of the cover to permit the cover being reversed, as desired. It is also apparent that with the plates 3 and 4, that any basket may be converted into a reversible covered basket, inasmuch as the same is readily applied to the rim 2 at the outside thereof above the handles, where the basket is provided with handles or above the rope or metal handles as is the usual custom. Thus the fastening devices will not of necessity constitute a handle and will only carry the weight of the cover.

It has been found that although the plates 3 and 4 may be attached at the ends of the basket adjacent the handles, it is also desirable and practical that they be attached to the rim at the front and rear walls of the basket. Where this done on small baskets or hampers, two plates 3 are attached, as for instance, upon the rim at the rear and one of the plates 4 are employed, while upon larger baskets and hampers at least two pairs of the plates 3 and 4 are employed.

It has been stated hereinbefore that the cover is reversible, that is, it can be turned upside down, and since the cover can be turned upside down, it is obvious, notably when the drawings are examined, that the cover can be turned end for end.

What is claimed is:

In a device of the class described, a receptacle having an outstanding rim; a cover resting on the rim; bails of equal length pivoted to the cover midway between the upper and lower faces of the cover, to provide for an inversion of the cover; and plates secured to the rim, one plate having a depending hook engaging one bail, and the other plate having an outstanding lug engaging the other bail, the lug being provided with a lock-receiving opening, each plate having a finger engaging beneath the rim and constituting means for so positioning the plates that the bails may be engaged interchangeably with the hook and the lug when the cover is reversed end for end.

In testimony that I claim the foregoing as my own, I have hereto affixed my signature in the presence of two witnesses.

HERMAN WEGWART.

Witnesses:
RALPH W. STORY,
KATHERINE WABUK.

Copies of this patent may be obtained for five cents each, by addressing the "Commissioner of Patents. Washington, D. C."